UNITED STATES PATENT OFFICE.

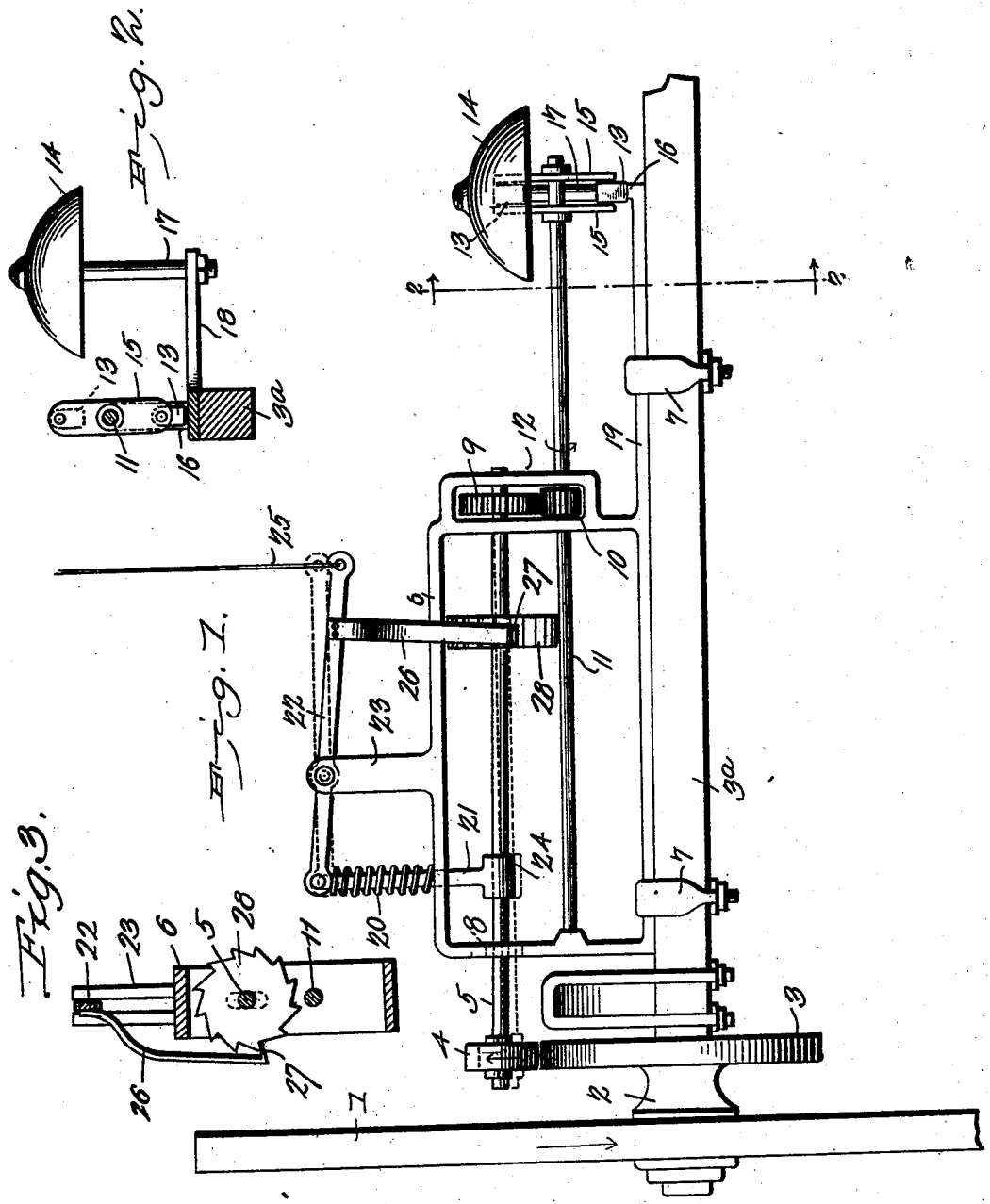

JOSEPH M. JUSTEN, OF TOLEDO, OHIO, ASSIGNOR OF TWO-FIFTHS TO GEORGE W. BIRCHALL AND CHARLES R. CLAPP, OF TOLEDO, OHIO.

ALARM FOR VEHICLES.

SPECIFICATION forming part of Letters Patent No. 722,587, dated March 10, 1903.

Application filed September 25, 1902. Serial No. 124,856. (No model.)

*To all whom it may concern:*

Be it known that I, JOSEPH M. JUSTEN, a citizen of the United States, residing at Toledo, in the county of Lucas and State of Ohio, have invented a new and useful Alarm for Vehicles, of which the following is a specification.

The invention relates to improvements in alarms for vehicles.

The object of the present invention is to provide for fire apparatus, patrol-wagons, street-cars, and other vehicles a simple and inexpensive alarm adapted to be operated by one of the wheels of a vehicle and capable of being readily thrown into and out of operation to enable the alarm to be sounded at the desired intervals.

The invention consists in the construction and novel combination and arrangement of parts hereinafter fully described, illustrated in the accompanying drawings, and pointed out in the claims hereto appended.

In the drawings, Figure 1 is an elevation of an alarm constructed in accordance with this invention. Fig. 2 is a sectional view on the line 2 2 of Fig. 1. Fig. 3 is a detail sectional view illustrating the manner of mounting the resilient pawl or dog and the ratchet-wheel.

Like numerals of reference designate corresponding parts in all the figures of the drawings.

1 designates a wheel provided at its hub with an extension 2 and journaled on the spindle of an axle 3ª in the usual manner, and the said hub has secured to it by suitable means a friction-wheel 3, which is adapted to communicate motion to a friction-pinion 4 of a shaft 5. The shaft 5, which is disposed longitudinally of the axle, is located above the same and is journaled in suitable bearings of a frame or bracket 6, which is secured to the axle by clips 7. The shaft 5 is capable of a limited vertical movement to carry the friction-gears into and out of engagement, and the bracket or frame, which is provided with a rectangular body portion, has a slot 8 at one end of the same to permit the said upward and downward movement of the shaft 5. The other end of the shaft 5 carries a gear 9, provided with spur-teeth and meshing with a pinion 10 of a counter-shaft 11, which is rapidly rotated by the said gearing when the friction-pinion is in engagement with the friction-wheel 3. The counter-shaft 11 is journaled in suitable bearings of the ends of the rectangular portion of the bracket or frame, which is provided with a rectangular guard 12, having bearings for the reception of the shafts and extending around the spur-gears. The guard is rectangular and is formed integral with the adjacent end of the bracket or frame.

The shaft 11 is extended outward beyond the frame and is provided at its outer end with a rotary bell-engaging device consisting of a support and a pair of pivoted clappers or hammers 13, arranged to engage a gong 14. The support consists of a pair of bars 15, centrally secured to the shaft and spaced apart to receive the clappers or hammers 13, which are provided with suitable pivots 16. The gong is mounted on a post or stem 17, secured to an arm 18, which extends rearward or outward from the axle; but it may be located in advance of the same, if desired. The arm 18, which is disposed horizontally, is preferably formed integral with a bar or extension 19 of the bracket or frame. As the shaft 11 is rotated the bell hammers or clappers are thrown outward and are caused to strike the gong at the outer edge thereof, whereby a continuous alarm is sounded while the friction-pinion 4 is in engagement with the gear-wheel 3.

The friction-pinion is normally held out of contact with the friction gear-wheel by means of a coiled spring 20, disposed on a rod or bar 21, which is pivoted at its upper end to one arm of a lever 22, and the latter is fulcrumed between its ends on an arm or post 23 of the frame or bracket. The frame or bracket is provided at its top with the said arm 23, and the spring is interposed between the frame and the lever. The lower end of the bar 21 is provided with a sleeve or bearing 24 to receive the shaft 5, and the outer end of the lever is connected with a cord 25 or other suitable means for enabling the lever to be readily oscillated for carrying the friction-pinion into engagement with the friction-wheel.

In order to enable the gong to be sounded when a vehicle is not in motion, the lever 22 is provided with a resilient pawl 26, depending from the arm to which the operating-cord 25 is connected and provided at its lower end with a tooth 27, arranged to engage and rotate a ratchet-wheel 28 when the lever 22 is lifted by the cord 25. The upper portion of the pawl is bent at an angle to clear the frame or bracket, and the ratchet-wheel is mounted on the shaft 5, which is carried by the said lever. By oscillating the lever 22 the gong may be sounded when a vehicle is not in motion.

It will be seen that the alarm is exceedingly simple and inexpensive in construction, that it is positive and reliable in operation, and that it is adapted for fire apparatus, police-patrol wagons, cars, and various other forms of vehicles. It will also be apparent that the alarm is readily operated to carry the friction-gears into engagement with each other and that when in engagement a continuous alarm will be sounded and that when the operating mechanism is released the spring 20 will automatically carry the friction-pinion 4 out of engagement with the friction-pinion 3.

What I claim is—

1. An apparatus of the class described comprising a bracket or frame designed to be mounted on a vehicle, a transverse shaft mounted in the bracket or frame and capable of a limited oscillatory movement, gearing connecting the transverse shaft with one of the wheels and adapted to be separated by the oscillatory movement of the said shaft, a counter-shaft mounted in the frame or bracket, gearing connecting the said shafts, means carried by the counter-shaft for striking a gong, and spring-actuated operating mechanism connected with the transverse shaft and normally holding the same out of operation, substantially as described.

2. An apparatus of the class described comprising an upright frame or bracket designed to be mounted on a vehicle, a transverse shaft mounted in the frame or bracket and capable of a limited upward and downward movement, a counter-shaft also mounted in the frame or bracket and provided with means for striking a gong, gears connecting the shafts, a lever fulcrumed on the frame or bracket, a rod connected with the lever and provided with a bearing-sleeve receiving the transverse shaft, a spring for holding the transverse shaft normally in an elevated position, gearing for connecting the transverse shaft with a wheel of the vehicle, said gearing being separable by the upward and downward movement of the transverse shaft, and means for operating the lever, substantially as described.

3. An apparatus of the class described comprising a frame or bracket designed to be mounted on a vehicle, a shaft mounted in the frame or bracket and capable of a limited oscillation, gearing for communicating the motion of the vehicle to the shaft, said gearing being separable by the oscillatory movement of the said shaft, a spring-actuated rod or bar having a sleeve receiving the shaft, a lever connected with the spring-actuated rod or bar, a shaft provided with means for striking a gong, and gearing connecting the shafts, substantially as described.

4. An apparatus of the class described comprising an upright frame or bracket designed to be mounted on a vehicle and provided with an extension having an arm, a gong mounted upon the arm, shafts mounted on the frame or bracket, one of the shafts being provided with means for striking the gong and the other shaft being capable of a limited oscillatory movement, gearing connecting the shafts, a rod or bar guided on the frame or bracket and connected with the oscillatory shaft, a lever fulcrumed on the frame or bracket and connected with the rod or bar, and gearing for communicating the motion of the vehicle to the oscillatory shaft, substantially as described.

5. An apparatus of the class described comprising an upright frame designed to be mounted on a vehicle and provided at one end with a guard and having an upwardly-extending arm at the top, shafts mounted on the frame, one of the shafts being capable of a limited oscillatory movement, means carried by the other shaft for striking a gong, gearing connecting the shafts and mounted within the said guard, a lever fulcrumed on the arm and connected with the oscillatory shaft, and gearing for communicating motion from the vehicle to the oscillatory shaft, substantially as described.

6. An apparatus of the class described comprising a bracket or frame designed to be mounted on a vehicle, a gong, a rotary striking device, gearing for communicating motion from the vehicle to the striking device, a shifting-lever connected with the gearing for throwing the same into and out of operation, a ratchet-wheel connected with such gearing, and a pawl or dog carried by the shifting-lever and arranged to engage and rotate the ratchet-wheel, substantially as described.

7. An apparatus of the class described comprising a frame, shafts mounted on the frame, one of the shafts being capable of a limited oscillatory movement, means carried by the other shaft for striking a gong, gearing connecting the shafts, a shifting-lever connected with the oscillatory shaft, gearing for communicating motion from the vehicle to the oscillatory shaft, a ratchet-wheel mounted on the oscillatory shaft, and a pawl or dog carried by the lever and arranged to engage the ratchet-wheel for rotating the same, substantially as described.

In testimony that I claim the foregoing as my own I have hereto affixed my signature in the presence of two witnesses

JOSEPH M. JUSTEN.

Witnesses:
JAMES E. WURT,
C. A. SEIDERS.